WILLIAM BLACK.
Improvement in Weighing-Scales.
No. 115,419. Patented May 30, 1871.
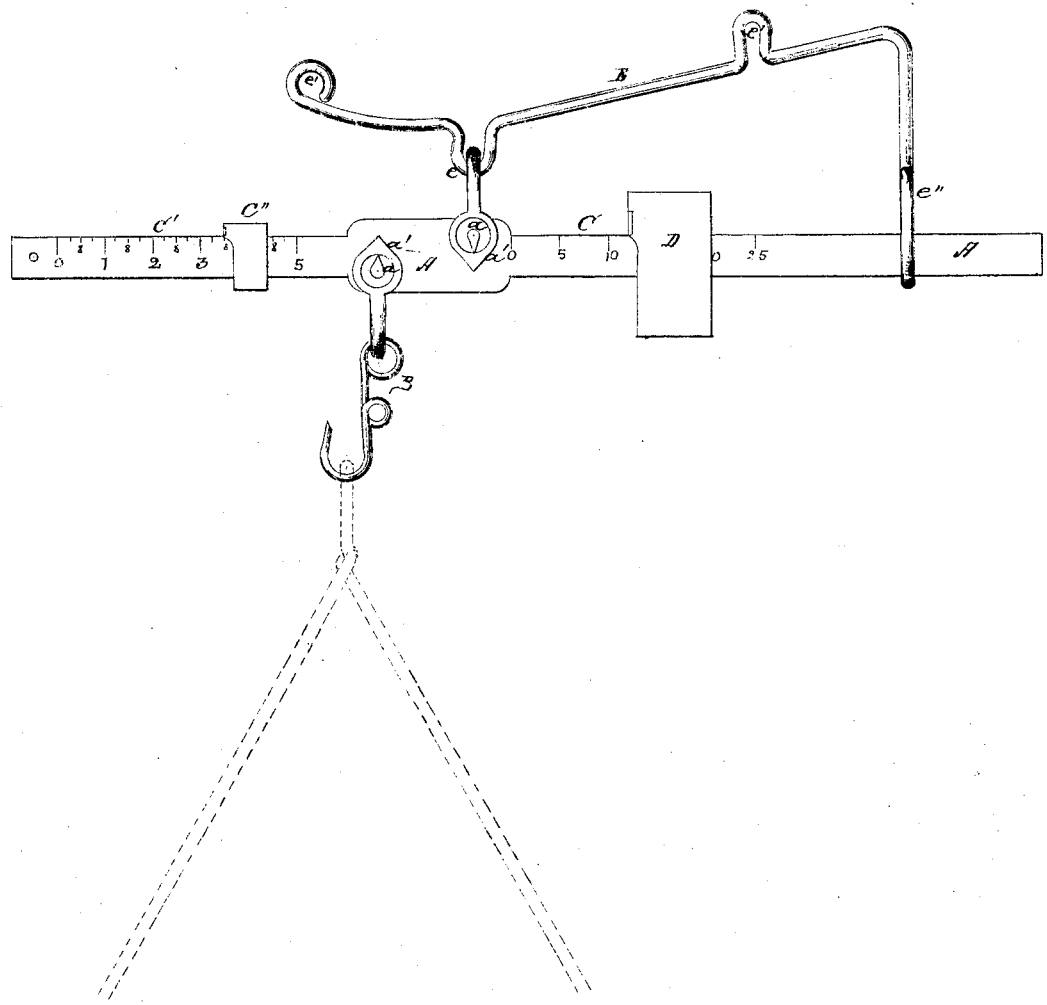

115,419

UNITED STATES PATENT OFFICE.

WILLIAM BLACK, OF BALTIMORE, MARYLAND.

IMPROVEMENT IN WEIGHING-SCALES.

Specification forming part of Letters Patent No. 115,419, dated May 30, 1871.

*To all whom it may concern:*

Be it known that I, WILLIAM BLACK, of the city and county of Baltimore and State of Maryland, have invented a new and useful Improvement in Scales; and I do hereby declare that the following is a full, clear, and exact description of the same, reference being had to the accompanying drawing making a part of this specification, in which the figure is a side elevation.

This invention relates to that class of balance-scales which is provided with a sliding counter-balance and a guard to prevent the kicking up of the longer beam; and it consists in the combination of such a scale with an independent, detachable, and portable holder-rod adapted to be suspended from two points, one on each side of the suspension-point of the scale-beam, and itself forming the guard for the scale-beam. The object of this arrangement is to provide for public use a cheap portable counterbalance scale, which can be readily suspended wherever it is needed, and which, although suspended and not attached to a frame, is yet so constructed that the guard will always be firmly held in place and will not be thrown up with the scale-beam when the latter rises.

In the drawing, A represents the scale-beam, having a long arm, C, graduated for integers, and a short arm, C′, on the opposite side of the point of suspension $a'$, graduated for fractions. D is a large pea, sliding on the arm C, for the purpose of weighing pounds, &c., and C″ is a small pea, sliding on the arm C′, for the double purpose of weighing fractions of a pound and also of counterbalancing the weight upon arm C. The hook B supports the material to be weighed.

So far as I have described the scale its general principles are old, a similar one having been heretofore used suspended in a frame from a bar firmly fixed thereto. As there constructed the supporting-bar must of necessity be screwed up against the top of the frame or against a ceiling overhead. The scale was not adapted to be carried round by hand, and whenever needed to be suspended loosely upon pegs, from which it could again be removed in an instant, without the necessity for a screwdriver or a claw-hammer, which are not always at hand.

In my invention, on the contrary, the holder E and guard $e''$ are made in one piece, from a single bent rod, and are provided with two loops, $s'$ $s'$, one on each side of the point $e$, where the scale-beam is suspended, so that by simply throwing said loops over a couple of nails driven wherever convenient to use the scale the instrument will be at once ready for use. If the holder were suspended from any single point the guard $e''$ would not keep the beam from kicking up, but would kick up with it. If suspended from two points on the same side of the link $a$ that supports the beam one end would have to be fastened in place by a nail or screw; but suspended as shown in my drawing it can be thrown carelessly over a couple of pegs anywhere, and will always work to perfection, and the instant it is no longer needed there it can be removed without the necessity of displacing a screw or nail.

This invention has been thoroughly tested by practical use and is found to be admirably adapted to small hand-scales for weighing a few pounds, and which a person wishes to use not in one particular place but in all kinds of places, wherever he may happen to be. The necessity of carrying a frame round would destroy the usefulness of the instrument. The necessity of screwing or nailing it to the ceiling or wall, and afterward removing the screws or nails in order to detach it, would also render it of no practical value. On the other hand, if the holder cannot be fastened firmly in place while the scale is used the guard is of no value, and the peas will slide out of place. A guard cannot be dispensed with in counterbalance scales.

All these difficulties are obviated by my simple device, and the portable counterbalance scale becomes as convenient for transportation and use as possible; while at the same time the cost of construction of the holder and guard is diminished ninety per cent. as compared with the cumberous devices heretofore in use.

Having thus described my invention, what I claim as new therein, and desire to secure by Letters Patent, is—

The combination of a sliding counterbalance scale, constructed as described, with a holder and guard, E $e''$, made in one piece, and adapted to be hung loosely upon nails or pegs by means of loops $e'$ $e'$ on opposite sides of the link $a$, where the scale-beam is suspended, substantially as described, and for the purposes specified.

To the above specification of my invention I have signed my hand this 14th day of December, 1869.

WM. BLACK.

Witnesses:
 CHAS. A. PETTIT,
 SOLON C. KEMON.